(No Model.)
F. P. AYER.
BUTTER MOLD.
No. 384,303. Patented June 12, 1888.
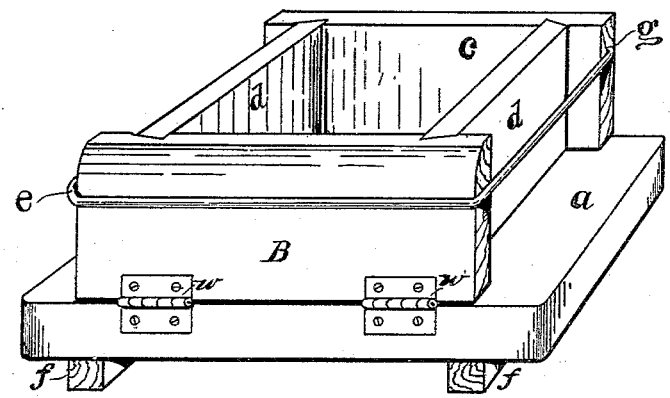
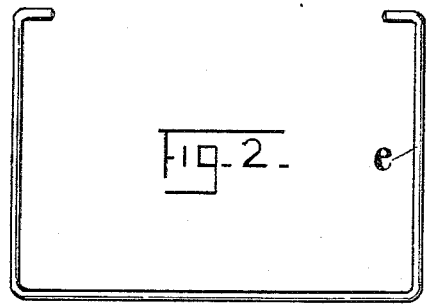
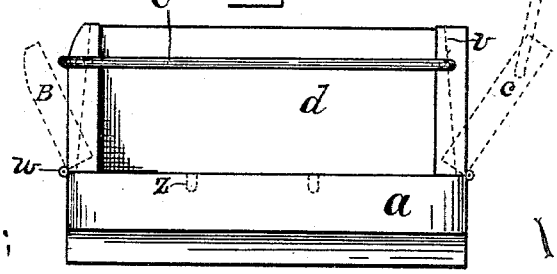
Witnesses:
Frank H. Allen
Allen Tenny
Inventor:
Frank Percy Ayer

UNITED STATES PATENT OFFICE.

FRANK PERCY AYER, OF LEBANON, CONNECTICUT.

BUTTER-MOLD.

SPECIFICATION forming part of Letters Patent No. 384,303, dated June 12, 1888.

Application filed June 17, 1886. Serial No. 205,516. (No model.)

*To all whom it may concern:*

Be it known that I, FRANK PERCY AYER, a citizen of the United States, residing at Lebanon, in the county of New London and State of Connecticut, have invented a new and useful Improvement in Butter-Molds; and I do hereby declare that the following is a full, clear, and exact description of the same.

My invention is for the use of butter-makers to mold and stamp their butter into a neat and convenient form for market. It is to be made in various sizes to hold different weights of butter. It is to be made of wood fastened with brass, in the form of a square or oblong box, with movable sides and ends.. The sides and ends are held in position by hinges, grooves, tenons, and a wire binder which is quickly and firmly adjusted.

In the drawings forming a part of this specification, Figure 1 is a perspective view of the mold. Fig. 2 is a detail of the wire binder; and Fig. 3 is an end view of the mold, the operation of the hinged parts thereof being shown by dotted lines.

$a$ is the bottom of the mold, on which the stamp is carved. The sides B $c$ are fastened to the bottom $a$ by two hinges, $w$, on the lower edge of each, which allows the sides to turn down and drop below the bottom $a$.

$f$ are wooden cleats to prevent the bottom from warping.

The sides B $c$ are held up in position by a binder, $e$, made of brass wire, which is pivoted into the end of side $c$ one-half inch from the top and passes around the outside of side B, and is pivoted into the end of side $c$ at a point opposite the starting-point, which allows it to be raised and turned back of side $c$. (See dotted line, Fig. 3.) The outside of side B is made beveling at the top, so that the binder will fit closely and hold the sides B $c$ firmly.

The end pieces, $d$, are beveled on their ends and made longer at the bottom than at the top, (see dotted line $v$, Fig. 3,) and are loosely tenoned to the bottom $a$ at $z$.

The hinged side pieces, B $c$, have grooves cut in their inner sides one-half inch from the ends and shaped to receive the end pieces, $d$, and when the sides are pressed against the ends they, (the ends,) being wedge-shaped, are held firmly in place, and are prevented from rising when butter is pressed into the mold.

*Directions for using mold.*—Place the mold on the table with the hinged side B toward you. Put the butter into the top of the mold and press it down with a tool made for that purpose. When the mold is filled, raise the binder $e$ and turn the hinged side pieces down. The butter now rests on the bottom $a$, between the wedge-shaped end pieces loosely tenoned to bottom $a$. The end pieces are then raised, with the butter between them, and placed on a plate with the stamped portion up. The ends are then removed, and the operation is complete.

What I claim as my invention, and desire to secure by Letters Patent, is—

1. A mold for shaping and stamping butter, consisting of stamped bottom $a$, wedge-shaped ends $d$ $d$, with beveled edges, the grooved and hinged sides, and means for clamping said parts together, substantially as described.

2. In combination with the bottom $a$, the end pieces, $d$ $d$, loosely tenoned thereto and having wedge-shaped ends and beveled edges, the hinged side pieces having grooves on their inner sides shaped to receive the end pieces, and the pivoted wire binder $e$, substantially as described.

FRANK PERCY AYER.

Witnesses:
 DANIEL TYERMAN FULLER,
 EDGAR WAYLAND NOYES.